(12) United States Patent
Barry et al.

(10) Patent No.: US 7,373,636 B2
(45) Date of Patent: May 13, 2008

(54) AUTOMATED SOFTWARE TESTING SYSTEM AND METHOD

(75) Inventors: Margaret Moya Barry, Chicago, IL (US); John Charles McEvoy, Algonquin, IL (US); Matthew Phillip Stewart, Villa Park, IL (US); Christine Ann Bowman, Crown Point, IN (US)

(73) Assignee: Accenture Global Services GmbH, Schaffhausen (CH)

( * ) Notice: Subject to any disclaimer, the term of this patent is extended or adjusted under 35 U.S.C. 154(b) by 534 days.

(21) Appl. No.: 10/431,798

(22) Filed: May 8, 2003

(65) Prior Publication Data

US 2003/0229825 A1     Dec. 11, 2003

Related U.S. Application Data

(60) Provisional application No. 60/379,934, filed on May 11, 2002.

(51) Int. Cl.
*G06F 9/44* (2006.01)
(52) U.S. Cl. .................. 717/124; 717/120; 717/126
(58) Field of Classification Search ........ 717/100–127, 717/1; 714/31–48; 709/229
See application file for complete search history.

(56) References Cited

U.S. PATENT DOCUMENTS

| | | | |
|---|---|---|---|
| 4,696,003 A | | 9/1987 | Kerr et al. |
| 4,803,683 A | * | 2/1989 | Mori et al. .................... 714/31 |
| 5,233,611 A | * | 8/1993 | Triantafyllos et al. ........ 714/46 |
| 5,335,342 A | | 8/1994 | Pope et al. ................. 395/575 |
| 5,572,668 A | | 11/1996 | See et al. ............... 395/183.14 |
| 5,892,947 A | * | 4/1999 | DeLong et al. ............. 717/100 |

(Continued)

FOREIGN PATENT DOCUMENTS

WO     WO 01/93043 A1    12/2001

(Continued)

OTHER PUBLICATIONS

Brinegar, M.K., Hays, D.E., Higdon, J.M., Jonczy, A.K. Lederer, J.F., Perkins, D.B., "Advanced Test System (Ats) for Software Test," IBM Technical Disclosure Bulletin, vol. 30, No. 9, pp. 135-136, Feb. 9, 1988.

*Primary Examiner*—Meng-Al T. An
*Assistant Examiner*—Mark P. Francis
(74) *Attorney, Agent, or Firm*—Brinks Hofer Gilson & Lione

(57) ABSTRACT

A system and method for testing an application includes modules capable of reading data from one or more data tables and providing the data as input to the application. The input data is correlated by test case, so that each module may provide different input data for each test case. The system also includes a controller that executes the modules. The controller is capable of determining an execution order for the modules by reading a flow table. The flow table correlates each test case with one or more modules, and further correlates each module within the test case with an execution order. The system may read results that the application generates in response to the input data, and correlate the results with the test case and module in a results table. The results table may also contain expected results, and the system may compare the actual results with the expected results to determine whether the application is functioning properly.

20 Claims, 5 Drawing Sheets

U.S. PATENT DOCUMENTS

| | | | |
|---|---|---|---|
| 5,905,856 A | 5/1999 | Ottensooser | 395/183.14 |
| 5,943,497 A * | 8/1999 | Bohrer et al. | 717/121 |
| 6,622,299 B1 * | 9/2003 | Santosuosso et al. | 717/127 |
| 6,951,013 B1 * | 9/2005 | Lozins | 717/125 |
| 6,959,433 B1 * | 10/2005 | Morales et al. | 717/127 |
| 2001/0052108 A1 * | 12/2001 | Bowman-Amuah | 717/1 |
| 2002/0087952 A1 * | 7/2002 | Tabe et al. | 717/124 |
| 2002/0116507 A1 * | 8/2002 | Manjure et al. | 709/229 |

FOREIGN PATENT DOCUMENTS

| | | |
|---|---|---|
| WO | WO 01/95662 A2 | 12/2001 |

* cited by examiner

USER TABLE

| TEST CASE | FIRST NAME | LAST NAME | PASSWORD |
|---|---|---|---|
| 1 | ALBERT | BUNDY | SHOES |
| 2 | MARGARET | WANKER | POTATO |
| 3 | MARCY | DARCY | ZIJCHEK |
| 4 | EKATERINA | GRIDNEVA | DEVICHKA |

ADDRESS TABLE

| TEST CASE | STREET | CITY | STATE | ZIP |
|---|---|---|---|---|
| 1 | 611 MAIN ST | EVANSVILLE | IN | 47708 |
| 2 | 110 RUSH ST | CHICAGO | IL | JONES |
| 3 | 12 MAPLE DR | INDIANAPOLIS | IN | 46220 |
| 4 | 512 TAFT RD | POSEYVILLE | IN | 47712 |

COVERAGE TABLE

| TEST CASE | COVERAGE |
|---|---|
| 1 | YES |
| 2 | YES |
| 3 | NO |
| 4 | YES |

INSURER TABLE

| TEST CASE | INSURER |
|---|---|
| 1 | ALLSTATE |
| 2 | TITEN |
| 3 | |
| 4 | BERKSHIRE |

FIG. 3

TEST APPLICATION DATABASE — 106

| TEST CASE | MODULE | RESULT |
|---|---|---|
| 1 | 2 | WELCOME |
| 1 | 10 | VALID ADDRESS |
| 1 | 3 | ALLSTATE |
| 1 | 4 | NO |
| 2 | 2 | WELCOME |
| 2 | 10 | INVALID ADDRESS |
| 2 | 3 | TITAN |
| 2 | 4 | YES |

FIG. 4

AUTOMATED SOFTWARE TESTING SYSTEM AND METHOD

This application claims the benefit of U.S. Provisional Application No. 60/379,934 filed on May 11, 2002.

FIELD OF THE INVENTION

The present invention relates generally to a system for testing software and particularly to methods and systems for automatically testing software using relational tables.

BACKGROUND OF THE INVENTION

Software development requires extensive repetitive testing both of the first version and of each new version of the software that is produced throughout the development process. With each new version comes a repetitive series of tests to determine if the changes made to create the version have affected the software in an unintended manner. This testing is usually accomplished by a testing organization, which is separate from the software development organization, for example, in a different department.

In addition, software development is usually accomplished in modules that require complete testing as each new module is added to the software product. Thus, repetitive testing is also required to ensure that each new module, besides adding the functions it was designed to accomplish, will not detrimentally affect the functionality of the integrated software product. Software tests may be organized into test cases, so that different test cases test the functionality of different modules or sets of modules, or of different functionalities of the software.

Advances in technology have made it possible to record the keystroke input of an operator as the first version of software is tested. Subsequent versions are tested by playing back the previously recorded session. A system of this type is disclosed by Kerr et al. in U.S. Pat. No. 4,696,003, issued Sep. 22, 1987. Another relevant keystroke recording and playback system is the Advanced Test System For Software Test as disclosed in IBM Technical Disclosure Bulletin, Vol. 30, No. 9, Feb. 9, 1988. Still another recording and playback system is disclosed by Pope, et al. in U.S. Pat. No. 5,335,342, issued Aug. 2, 1994. In this system, a first version of interactive software is executed and all input signals, such as mouse activity and keystrokes, and output screens are recorded. When a new version of the software is created, the recorded input signals may be introduced to the software, and the new output screens compared to the recorded output screens.

Generally, software testing organizations use some type of record and playback functionality of input and/or output to produce one automated test script per test case. Each test script contains the data, execution logic and expected results for the test case. Within each script there may be common application functionality and logic.

Software testing organizations often use commercially available automated testing tools to test software. Record and playback test script generation is the most commonly demonstrated feature of commercially available automated testing tools. Record and playback functionality is one of the most intuitive methods to test software. Merely recording software input and playing it back tends to make the process of test automation appear very straightforward and easy. As the software application under test changes, however, it may also be necessary to change one or more of the test scripts. Maintaining a large number of test scripts that require frequent modification may become time consuming to the point of being overwhelming.

To help minimize the maintenance of test scripts, testing organizations have begun to use the record and playback functionality in conjunction with parameterized data in an effort to create more robust recorded scripts. Data is said to be "parameterized" when the automated test scripts read the test data values from an external source, such as a file, rather than having the values hard coded into the scripts. For example, pointer movements and selections that navigate through a series of screens may be "hard coded" into a script, while keyboard strokes (text data) may be read from a data structure or a data file. This method allows a variety of data scenarios to be tested by a single test script.

Nevertheless, even when using parameterized data with recorded scripts, many test cases have to be created to cover all of the target test cases. For example, one test script may be needed for each test case. Therefore, with each of the above methods it may become more difficult to maintain existing automated scripts as more test cases are automated. Maintenance of these scripts may become more complicated both during initial testing and later in regression testing. It would be desirable to provide an automated test system that allowed a single script to be used with many different test cases.

SUMMARY OF THE INVENTION

A system for testing an application is provided that includes a flow table that relates test case identifiers to order identifiers and module identifiers, and an input table that relates the test case identifiers to input values. The system also includes a module that corresponds to one of the module identifiers, which may read an input value from the input table and provide the input value to the application. The system may also include a controller that reads the flow table and determines the module identifier based on one of the test case identifiers. The controller may execute the identified module.

The system may also include a results table. If so, then the controller may receive an output value from the application, and relate the output value to the test case identifier and the module identifier in the results table. Each of the tables in the system may be stored in a database.

A method for testing an application is also provided, which includes a step of relating module identifiers to test case identifiers and order identifiers in a flow table, and a step of relating the test case identifiers to input values in an input table. The method also includes the step of reading a module identifier that corresponds to a test case identifier and an order identifier from the flow table, and executing a module that corresponds to the module identifier. The method further includes reading from the input table, via the module, an input value that corresponds to the test case identifier and providing the input value to the application.

The method may also include the steps of receiving an output value from the application and relating the test case identifier and the module identifier to the first output value in a results table. Additionally, the method may include the steps of receiving a second output value from the application and relating the second output value to the test case identifier and the module identifier in the results table. Where the method includes receiving the first and second output values, the method may also include the step of determining whether the first output value is equal to the second output value.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 3 illustrates relational tables of input data.
FIG. 4 illustrates a relational table of test data results.

DETAILED DESCRIPTION OF THE PRESENTLY PREFERRED EMBODIMENTS

Figure 1:
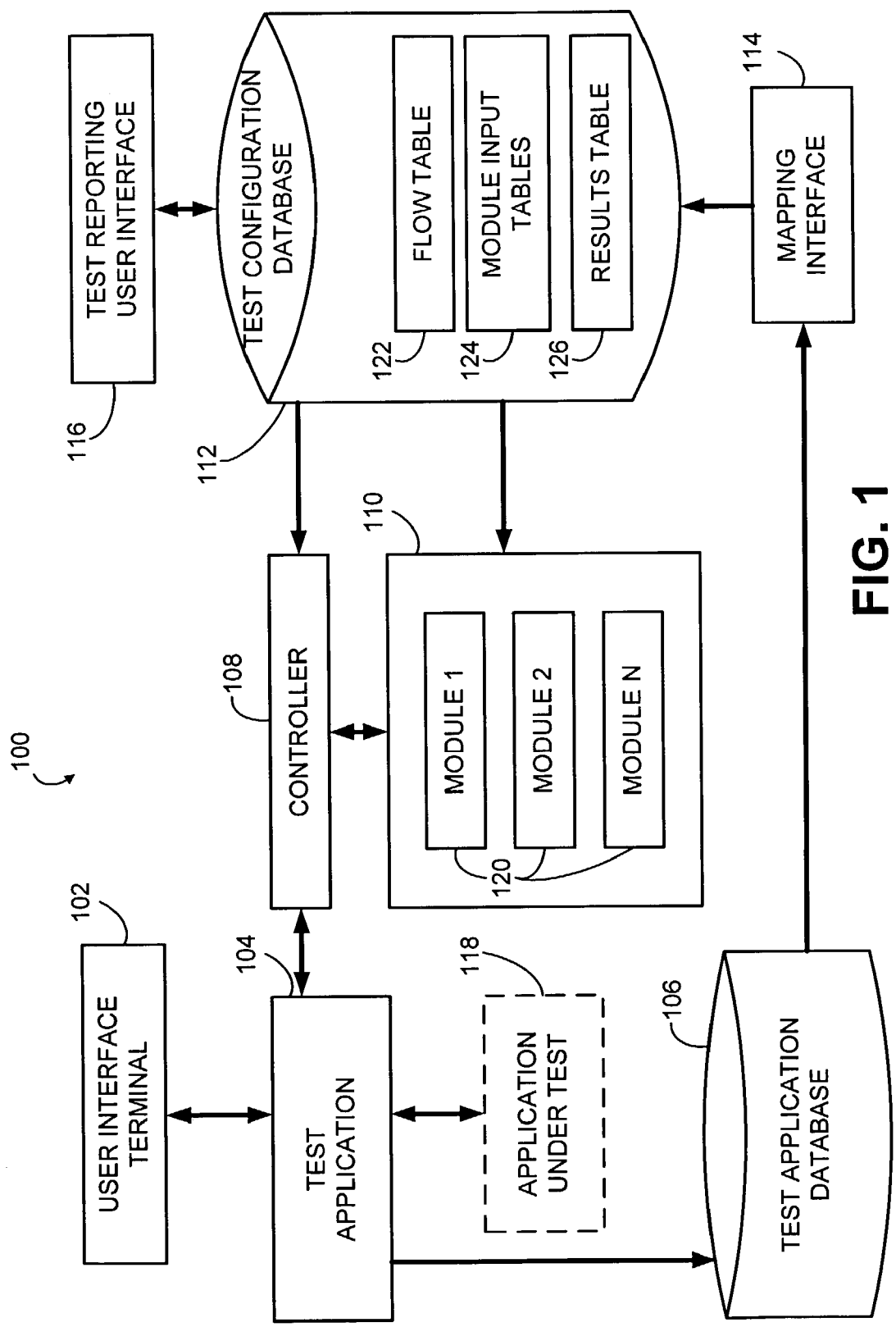
FIG. 1 is a system-level data flow diagram of a testing system.

Referring to FIG. 1, a system-level data flow diagram of a testing system 100 is generally illustrated. The testing system 100 includes a user interface terminal 102, a test application 104, a test application database 106, a controller 108, modules 110, a test configuration database 112, a mapping interface 114, and a test reporting user interface 116. The test configuration database 112 includes a flow data table 122, module input tables 124, and a results data table 126.

Also shown in FIG. 1 is an application under test 118, which is to be tested by testing system 100. The term "application" is used herein to refer to any combination of hardware and software that accepts one or more electromagnetic (including optical) signals as an input and produces one or more electromagnetic signals as an output. One example of an application is an internet hyper-text transfer protocol (HTTP) client and/or server program running on one or more computer systems. Another example of an application is an embedded control program running on a microprocessor inside a wireless telephone or terminal. A further example of an application is a software program running on a personal computer having a graphical user interface (GUI). The systems and methods for practicing the present invention function equally well with any type of application under test 118, and the illustrative embodiments herein are not intended to limit the claimed invention in any way.

The modules 110 may each be a software module 120 that is capable of stimulating the application under test 118 by providing input signals to the application. For example, each module 120 may be a C shell script on a UNIX system. Alternatively, each module 120 may be a stand-alone executable program. In a preferred embodiment, each module 120 is a script for use with test software, for example the test application 104. The test application 104 may be a commercially available package, such as WinRunner test software provided by Mercury Interactive of Sunnyvale, Calif., SQA Robot supplied by SQA, Inc. of Woburn, Mass., or MS Test, which is supplied by Microsoft Corporation of Redmond, Wash., or any other type of package.

Where the test application 104 is a commercially available package, a controller 108 may be used to provide an interface between the test application 104 and the modules 110. For example, the controller 108 may appear to be one or more test scripts from the perspective of the test application 104, and may appear to be the test application 104 to the modules 110. Where the test application 104 is specifically designed to work with the modules 110 described herein, the controller 108 may be unnecessary. In this case, the functionality attributed to the test application 104 and the controller 108 may all be performed by an integrated testing applicatton.

The modules 110 may be created by manually entering the code of each module 120 into a text editor or a similar software program. In a preferred embodiment, however, the modules 110 are recorded using the record/playback functionality of the test application 104. The recording of the modules 110 may be performed by the standard method inherent in the test application 104. Alternatively, the modules 110 may be recorded using the test application 104, and then modified as desired with a text editor or a similar software program capable of editing source code. For example, the modules 110 may be modified in order to parameterize the input data provided to the application under test 118, so that the input data may vary from one test case to the next test case.

The flow data table 122, the module input tables 124, the results data table 126, and the test application database 106 may each be a relational table. The terms "table", "relational table", and "database" are used interchangeably herein to refer to a data structure capable of relating one set of data elements to one or more other sets of data elements. For example, a relational table may relate a set of names to a set of telephone numbers.

A relational table containing other tables is referred to herein as a "database" for clarity, but the use of this term is not intended to limit the claimed invention in any way. A database may contain one or more tables that may or may not be related. In a preferred embodiment, relational tables are created and maintained via database software, such as Microsoft Access supplied by Microsoft Corporation, MySQL supplied as open source software at http://www-.mysql.com/ and elsewhere, Sybase supplied by Sybase, Incorporated, Oracle supplied by Oracle Corporation, or some other type of database software.

The claimed invention, however, is not limited to the use of commercially available database software, and other methods of creating the tables described herein may be used. For example, the tables may be implemented as data structures in the test application 104, the controller 108, and/or the modules 110. The creation of data tables using arrays, linked lists, or other data structures and/or data classes with our without file structures is well known by those skilled in the art of software engineering.

The flow data table 122, the module input tables 124, the results data table 126 and the test application database 106 may each exist in a separate database, or other data structures. In a preferred embodiment, however, the flow data table 122, the module input tables 124, and the results data table 126 all exist in a test configuration database 112. The test application database 106 may comprise a single table, and exist as a separate database. The test configuration database 112 and the test application database 106 may exist on one or more database servers separate from the other components of the testing system 100. Where one or more database servers are utilized, communications between the test configuration database 112 and the other components of testing system 100 may be carried out via a computer network or some other communications medium.

In a preferred embodiment, the test configuration database 112 includes one or more data entry forms capable of acting in conjunction with the test reporting user interface 116 as a high-level user interface for the flow data table 122, the module input tables 124, and the results data table 126. Alternatively, the flow data table 122, the module input tables 124, and the results data table 230 may be directly modified by a user via the test reporting user interface 116 or some other user interface, without the use of forms.

The user interface terminal 102 and the test reporting user interface 116 may each be either a physical terminal, or an interface capable of receiving input and providing visual and/or audio output. In a preferred embodiment the user interface terminal 102 and the test reporting user interface 116 are each a computer terminal having a keyboard, a pointing device, a display, and a graphical user interface. Alternatively, user interface terminal 102 and the test reporting user interface 116 may each be an interface, such as a window, accessed through a remote terminal. The user interface terminal 102 and the test reporting user interface 116 may be either directly connected to the other components of testing system 100, or each may communicate with testing system 100 via a network.

To summarize the operation of testing system 100, a user creates the modules 110, for example by using the recording functionality of the test application 104. The user then parameterizes each module 120 as desired. The run order of the modules 110 within each test case is then entered into the flow data table 122. The parameters (input values) for each module 120 are entered into the module input tables 124. Once each of the above set-up steps has been completed, not necessarily in the above order, the testing system 100 is prepared to test the application under test 118.

During testing, the controller 108 reads the flow data table 122, and executes, via the test application 104 to execute, each module 120 in sequence according to the flow data table 122. As each module 120 is being executed by the test application 104, the module 120 reads input values from the module input tables 124. The test application 104 provides these input values to the application under test 118. Also, the test application 104 reads the output values (results) from the application under test 118, and stores the output values in the test application database 106. These "actual results" may be stored as "expected results" where the application under test 118 is a baseline version, or compared to previously stored "expected results" where the application under test 118 is a new or updated version.

Figure 2:
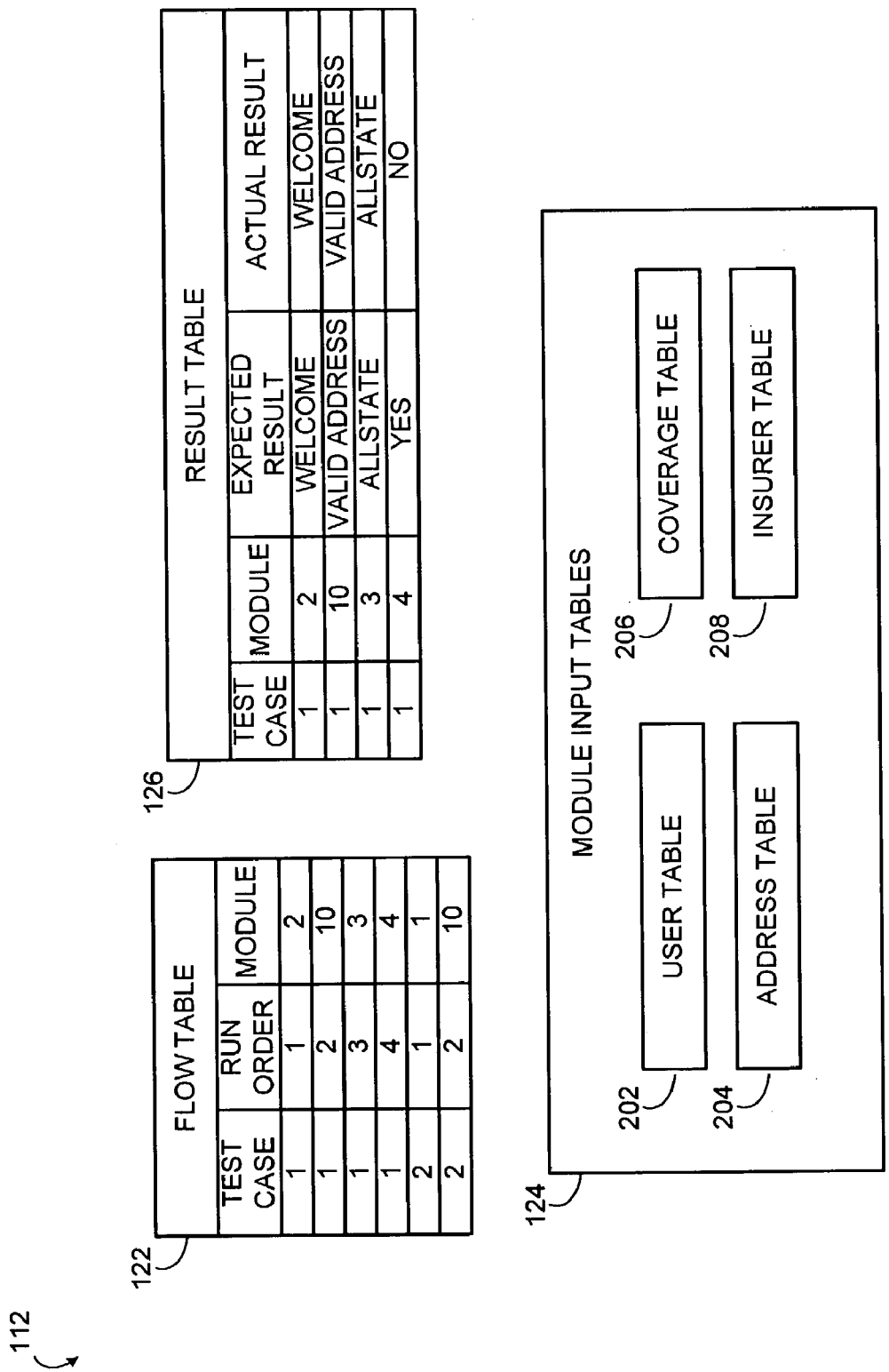
FIG. 2 illustrates a database of relational tables.

An illustrative flow data table 122 is shown in detail in FIG. 2, illustrative module input tables 124 are shown in detail in FIG. 3, and an illustrative test application database is shown in detail in FIG. 4. Using these detailed exemplary tables, the operation of the testing system 100 will now be explained in greater detail. The form and content of the tables in FIGS. 2-4 will vary greatly depending on the nature of the application under test 118. The following description of the testing system 100, and the tables in FIGS. 2-4 are merely illustrative, and are not intended to limit the claimed invention in any way.

The process of testing the application under test 118 begins when a user activates the test application 104 by the use of user interface terminal 102. The test application 104 may execute the controller 108, or, if the controller 108 is already running, then the test application 104 may signal the controller 108 to begin one or more test cases. In response, the controller 108 may read data from the flow data table 122 to determine the execution order of the modules 110 within the one or more test cases.

As shown in FIG. 2, the flow data table 122 relates a test case identifier and a run order value to a module identifier. Each module identifier is associated with one of the modules 110. Each test case identifier is associated with a particular test case. The run order values indicate the flow control for the modules within a test case.

Consider a flow control example where a first test case is associated with test case identifier "1", a second test case is associated with test case identifier "2", a first module 120 is associated with module identifier "1", a second module 120 is associated with module identifier "2", and so on. As shown in FIG. 2, for the first test case, the run order value of "1" is associated with the second module 120. Therefore, for the first test case, the second module 120 will be executed first. Likewise, for the first test case the run order value of "2" is associated with module identifier "10", so the tenth module 120 will be executed second. In this fashion, the controller 108 reads a module flow order for a test case from the flow data table 122, and executes modules 110 in turn via the test application 104.

Upon execution, each module 120 may read input values from the module input tables 124 shown generally in FIG. 2, and in detail in FIG. 3. In FIG. 3, four illustrative module input tables 124 are shown. In this illustrative example, the module input tables 124 include a user table 202, an address table 204, a coverage table 206, and an insurer table 208.

Each module 120 may be provided with a test case identifier by, for example, the controller 108 or the test application 104. Upon execution, a module 120 may read input values based on the provided test case identifier. For example, the first module 120 may simulate a login sequence of the application under test 118. Given a test case identifier of "1", the first module 120 may read the values "ALBERT", "BUNDY" and "SHOES" from the user table 202.

Based on the column identifiers, the first module 120 may associate the value "ALBERT" with a parameter representing a user's first name, the value "BUNDY" with a parameter representing a user's last name, and the value "SHOES" with a parameter representing a user's password. In this illustrative embodiment, the columns of the module input tables 124 are designated descriptively to improve legibility, but any designations may be used. The first module 120 may then provide, via the test application 104, these values from the user table 202 as inputs into the application under test 118.

Each module 120 may also cause the application under test 118 to generate one or more output values that may be read by the test application 104. For example, in response to the input values "ALBERT", "BUNDY" and "SHOES", the application under test 118 may generate the output "WELCOME". The test application 104 may relate the generated output values to corresponding test case identifiers and module identifiers in the test application database 106, shown in FIG. 4.

For a further example, when the tenth module 120 executes with a provided test case identifier "2", it may read the values "110 RUSH ST", "CHICAGO", "IL", and "JONES" from the address table 204. These input values may then be provided as inputs into the application under test 118. In response to the input values "110 RUSH ST", "CHICAGO", "IL", and "JONES", the application under test 118 may generate the output "INVALID ADDRESS". The test application 104 may relate the generated output value "INVALID ADDRESS" to test case identifier "2" and module identifier "10" in the test application database 106.

Likewise, when the third module 120 executes with a provided test case identifier "1", it may read the value "ALLSTATE" from the insurer table 208, and cause the application under test 118 to generate the result "ALLSTATE". The test application 104 may relate the generated output value "ALLSTATE" to test case identifier "1" and module identifier "3" in the test application database 106. Finally, when the fourth module 120 executes with a provided test case identifier "1", it may read the value "YES" from the coverage table 206, and cause the application under test 118 to generate the result "NO". (As will be explained below, the result "NO" is incorrect, and indicates that the application under test 118 is not functioning properly.)

In a preferred embodiment, the testing system 100 operates in three modes. In a first mode, referred to herein as the "test mode", testing system 100 compares actual results from the application under test 118 against a stored set of expected results. For example, the test mode may be used to debug the application under test 118 during creation of a baseline version of the application under test 118, or during regression testing of an updated version of the application under test 118.

In the test mode, the mapping interface 114 reads one or more sets of the output values (actual results), test case identifiers and module identifiers from the test application database 106. The mapping interface 114 then relates these output values to previously stored expected output values in the results data table 126. The mapping interface 114 accomplishes this "mapping" by using the test case identifiers and module identifiers as indices into the test application database 106. Once a test case has been at least partially completed, the user may view the test results via the test reporting user interface 116.

In a second operational mode, referred to herein as the "baseline mode", the mapping interface 114 reads one or more sets of the output values, test case identifiers and module identifiers from the test application database 106 after tests have been run on a baseline (known working version) of the application under test 118. In the baseline mode, the mapping interface 114 stores these output values from the baseline of the application under test 118 as "expected results" in the results data table 126. The mapping interface 114 relates these expected results to test case identifiers and module identifiers. In this manner, expected output values may be automatically generated and stored by simply testing a known-working baseline of the application under test 118.

In a third operational mode, referred to herein as the "manual mode", the user may manually enter expected results for each test case identifier and module identifier pair. In manual mode, the test reporting user interface 116 may utilize a user interface, such as a database entry form, to facilitate the manual entry or modification of expected results in the results data table 126. Furthermore, the manual mode may also be used to enter information into the flow data table 122, the module input tables 124, and the results data table 126. Again, forms may be used to facilitate the entry of data into the test configuration database 112, or data may be entered directly into the test configuration database 112.

In the exemplary embodiment described herein, the expected results "WELCOME", "VALID ADDRESS", "ALLSTATE", and "YES" were related in the result table 126 to test case identifier "1" and module identifiers "2", "10", "3", and "4", respectively. The actual results, however, differ because test case identifier "1" and module identifier "2" actually produced an output of "NO" rather than the expected output of "YES". By using the test reporting user interface 116, the user may either manually compare the expected results and the actual results, or utilize a comparison script to indicate whether a test case executed successfully.

Figure 5:
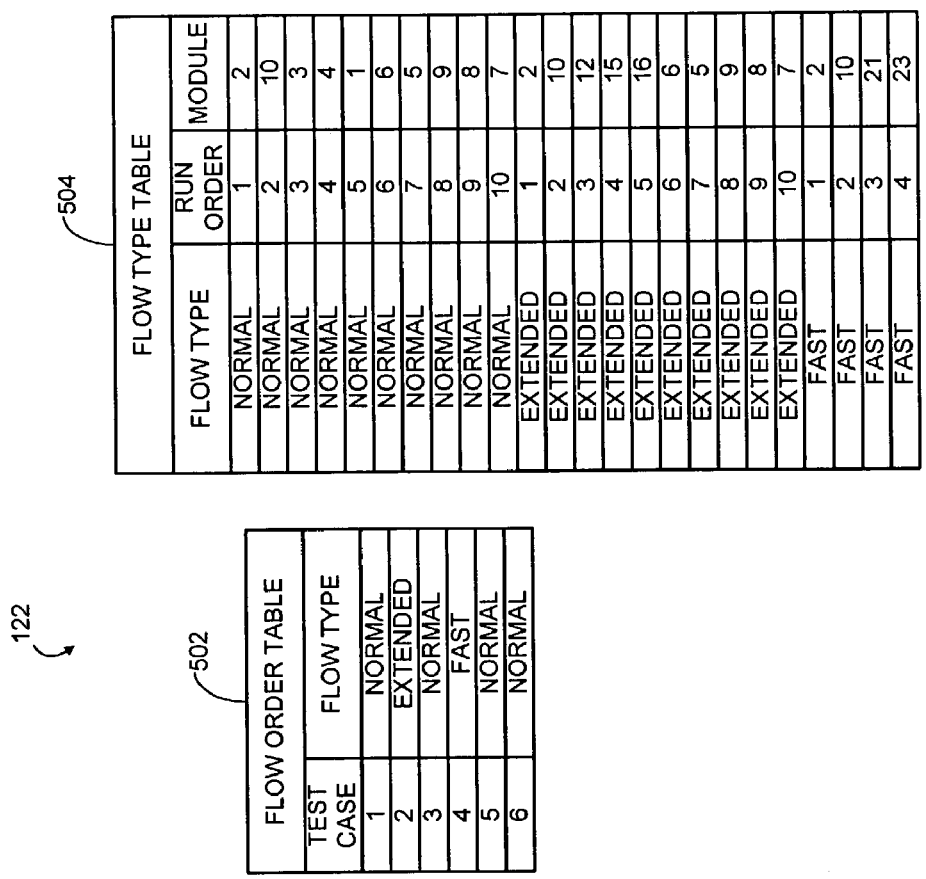
FIG. 5 illustrates relational tables of flow information for modules.

In the embodiment described above, the run orders of the modules 110 are indicated separately for each test case. In an alternate embodiment, run orders of the modules 110 are categorized into flow types, and each test case is associated with a flow type. An exemplary flow table 122 illustrating this alternate embodiment is shown in FIG. 5. A flow order table 502 relates each test case with a flow type.

For example, a first test case is associated with a flow type "NORMAL" in flow order table 502. A flow type table 504 associates each flow type with run order values and module identifiers. In this example, each test case associated with the flow type "NORMAL" will execute the modules 110 associated with module identifiers "2", "10", "3", "4", "1", "6", "5", "9", "8", and "7", in that order. In this manner, additional degree of flexibility may be incorporated into the testing system 100.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for testing an application, the method comprising:
    relating, in a first data structure, a plurality of module identifiers to one of a plurality of test case identifiers and a plurality of order identifiers associated with the one of the test case identifiers;
    relating, in a second data structure, the plurality of test case identifiers to a plurality of input values;
    reading, from the first data structure, a module identifier that corresponds to the one of the test case identifiers and is identified by an order identifier of the plurality of order identifiers as being next in execution order;
    executing a module that corresponds to the module identifier;
    reading, via the module, from the second data structure, an input value of the plurality of input values that corresponds to the one of the test case identifiers;
    providing, via the module, the input value to an application; and
    receiving an output value from the application, and relating, in a third data structure, the one of the test case identifiers and the module identifier to the output value.

2. The method of claim 1, further comprising relating, in the third data structure, the one of the test case identifiers and the module identifier to an expected output value.

3. The method of claim 2, further comprising determining whether the expected output value is equal to the output value.

4. The method of claim 1, wherein relating, in the first data structure, the plurality of module identifiers includes creating a relational table in a database.

5. The method of claim 1, wherein relating, in the second data structure, the plurality of test case identifiers includes creating a relational table in a database.

6. The method of claim 1, wherein relating, in a first data structure further comprises with the order identifiers, setting the execution order of each of a plurality of modules that correspond to each of the respective module identifiers.

7. The method of claim 1, wherein reading from the first data structure comprises with the order identifiers, determining an execution order of each of a plurality of modules that correspond to each of the respective module identifiers.

8. A computer program for testing a computer application, the program comprising:

computer readable program code to relate, in a first data structure, a plurality of module identifiers to each of a plurality of test case identifiers and a plurality of order identifiers associated with each of the respective test case identifiers;

computer readable program code to relate, in a second data structure, the plurality of test case identifiers to a plurality of input values;

computer readable program code to read, from the first data structure, a module identifier that corresponds to a test case identifier of the plurality of test case identifiers, and is indicated as being next in execution order by an order identifier of the plurality of order identifiers associated with the test case identifier;

computer readable program code to execute a module that corresponds to the module identifier;

computer readable program code to read, via the module, from the second data structure, an input value of the plurality of input values that corresponds to the test case identifier;

computer readable program code to provide, via the module, the input value to the computer application; and computer readable program code to receive an output value from the computer application, and to relate, in a third data structure, the test case identifier and the module identifier to the output value.

9. The computer program of claim 8, further comprising computer readable program code to relate, in the third data structure, the test case identifier and the module identifier to an expected output value.

10. The computer program of claim 8, wherein the computer readable program code to read from the first data structure comprises computer readable program code to determine, with the order identifiers, an execution order of each of a plurality of respective modules that correspond to each of the respective module identifiers.

11. A system for testing an application, the system comprising:

a computing device;

a first relational table accessible with the computing device and configured to relate each of a plurality of test case identifiers to a plurality of order identifiers and associate each of the plurality of order identifiers with one of a plurality of module identifiers, the plurality of order identifiers operable to describe an execution order in a respective test case of a plurality of modules identified by respective module identifiers;

a second relational table accessible with the computing device and configured to relate each of the plurality of test case identifiers to one or more input values;

a controller executable with the computing device to read the first relational table, to determine a module execution order of a selected test case based on the plurality of order identifiers, and to cause the plurality of modules to execute in the module execution order described by the plurality of order identifiers;

a module that corresponds to a module identifier of the plurality of module identifiers, wherein the module, upon execution with the computing device, is operable to read from the second relational table an input value from the plurality of input values and provide the input value to the application; and a third relational table, wherein the controller is further executable with the computing device to receive an output value from the application, and to relate, in a third relational table, the test case identifier and the module identifier to the output value.

12. The system of claim 11, wherein the controller is further executable with the computing device to relate, in the third relational table, the test case identifier and the module identifier to an expected output value.

13. The system of claim 12, wherein the controller is further executable with the computing device to determine whether the expected output value is equal to the output value.

14. The system of claim 11, further comprising a database, wherein the database includes the first and second relational tables.

15. The system of claim 11, where the first relational table and the second relational table are in at least one data structure that is separate from the application.

16. The system of claim 11, wherein the controller is further executable with the computing device to determine, from the order identifiers, an execution order of each of a plurality of respective modules that correspond to each of the respective module identifiers.

17. The system of claim 11, wherein the input value is associated with a test case identifier of the selected test case in the second relational table.

18. The system of claim 11, wherein the controller is executable with the computing device to associate the input value with a parameter based on a column designation also included in the second relational table.

19. The system of claim 11, further comprising a test application executable with the computing device to execute the module.

20. The system of claim 19, wherein the test application includes the controller.

* * * * *